United States Patent [19]
Yost

[11] Patent Number: 5,370,433
[45] Date of Patent: Dec. 6, 1994

[54] COMBINATION PICKUP DEVICE AND TINE CLEANER

[76] Inventor: Louis E. Yost, 305 Miller Dr., Emerald Isle, N.C. 28594

[21] Appl. No.: 151,970

[22] Filed: Nov. 15, 1993

[51] Int. Cl.$^5$ .............................................. A01D 9/06
[52] U.S. Cl. ................................. 294/50.5; 294/61
[58] Field of Search ................. 294/19.1, 50, 50.5, 294/50.7, 50.8, 61, 58; 70/200, 203, 224, 61

[56] References Cited

U.S. PATENT DOCUMENTS

| | | | |
|---|---|---|---|
| 1,225,188 | 5/1917 | Smith | 294/50.5 |
| 1,246,487 | 11/1917 | Summers et al. | 294/61 |
| 1,501,965 | 7/1924 | Moors | 294/50.5 |
| 1,993,314 | 3/1935 | Belford | 294/61 |
| 2,191,226 | 2/1940 | Clem | 294/50 X |
| 2,695,188 | 11/1951 | Klausman et al. | 294/61 |
| 2,732,242 | 3/1952 | Belford . | |
| 2,800,354 | 7/1957 | King . | |
| 2,804,336 | 8/1957 | Thompson . | |
| 3,183,031 | 9/1963 | Haberstick . | |
| 3,264,028 | 8/1966 | Rasmussen . | |
| 4,081,192 | 3/1978 | Jones | 294/61 |
| 4,183,570 | 1/1980 | Broyles et al. . | |
| 4,575,143 | 3/1986 | Nast . | |
| 4,856,835 | 8/1989 | Pacione . | |
| 4,909,554 | 3/1990 | Pacione | 294/50.5 X |
| 5,054,830 | 10/1991 | Nisenbaum | 294/58 |
| 5,193,871 | 3/1993 | Williams | 294/61 |

Primary Examiner—Dean J. Kramer
Attorney, Agent, or Firm—John G. Mills and Associates

[57] ABSTRACT

This invention is a combination pickup device and tine cleaner having an elongated sleeve with an actuating shaft mounted therein. A tine head is mounted on one end of the sleeve and a handle on the other end. A plurality of tines outwardly project from the tine head on the opposite side from the sleeve. A cleaning plate, with openings in axial alignment with the tines, is mounted on the end of the actuating shaft adjacent the tine head. An actuating knob is mounted on the opposite end of the shaft so that as debris is picked up by the tines, the plate will be pushed up adjacent to the tine head causing the actuating knob to move out of the sleeve adjacent the handle. By pushing on the knob, the shaft can be forced back into the sleeve adjacent the handle which will cause the cleaning plate to move down the tines to clean the same. A height adjustable handle provided in a modification. Also, a pin to lock the device with the tips of the tines covered by the cleaning plate is provided.

3 Claims, 4 Drawing Sheets

COMBINATION PICKUP DEVICE AND TINE CLEANER

FIELD OF INVENTION

This invention relates to hand held implements and more particularly to tine cleaning means for pickup type devices.

BACKGROUND OF INVENTION

Picking up trash and debris from yards, shoulders of roads, parking lots and the like is a labor intensive job that can quickly lead to backaches and back fatigue.

The simplest remedy for the above problems, and one that has been widely used over the years, is an elongated handle with a spike sticking out one end thereof so that trash and debris can simply be speared and when the spike is full, the trash and debris can be pushed off the same with the hand into a bag or other receptacle.

The handled spike works fairly well for trash such as pieces of paper or the like, but the smaller the trash or debris is, the harder it is to accurately spear the same. This is particularly true of small pieces of relatively flat material as well as such items as drink cans, pine cones and the like. Also when picking up trash discarded by humans, there is an ever increasing danger of the user of the pickup device becoming contaminated with chemicals or disease carrying media by having to push the debris off the spike by hand.

Pickup devices with multiple spikes have been developed to eliminate the accurate spearing that the single spiked pickup device requires so that small pieces of trash, cans and the like as well as yard debris such as pine cones, encased nut hulls and the like can be more readily picked up without requiring accurate placement of the device during use.

Along with the development of multi-tined pickup devices, tine cleaning means of various types have been developed. All of these devices however require the manipulation of handles or levers which quickly becomes very tiring to the average user and with people who have arthritis and similar problems, the manipulation of such devices may be very difficult if not impossible.

The following references represent the closest prior art of which the inventor is aware:

CONCISE EXPLANATION OF REFERENCES

U.S. Pat. No. 2,804,336 to Thompson discloses a pickup tool having a plurality of tines with a plate-like member 28 for cleaning such tines when handle 43 is squeezed.

U.S. Pat. No. 2,800,354 to King discloses a plurality of spike-like tines with a tine cleaning plate 22 that is operated by manipulation of handle 44.

U.S. Pat. No. 4,856,835 to Pacione discloses a tool for picking up litter including a plurality of tines shown in FIGS. 21 through 25 with a liter ejector pad 108 activated by squeezing lever 122 and handle 114 together.

U.S. Pat. Nos. 2,732,242 to Belford and 4,575,143 to Nast disclose tines that are longitudinally retracted into a shaft-like housing, with downward pressure on the handle end thereof extending the tines from the housing.

Finally, U.S. Pat. Nos. 4,183,570 to Broyles et al, 3,183,031 to Haberstick and 3,264,028 to Rusmussen are considered of general interest in that they disclose additional pickup type devices.

BRIEF DESCRIPTION OF INVENTION

After much research and study into the above mentioned problems, the present invention has been developed to provide an improved pickup device and associated tine cleaner for the same.

The tines of the present invention are not exposed until the device is pressed down over the trashed or debris to be picked up at which time the cleaner retracts up the tines and is held in such position by the trash or other material on the tines. Once the tines are full, the thumb of the hand holding the handle can be used to press down on the knob now extending above such handle to clear the tines. Also the other hand of the user can be used to tap the knob operating the cleaning plate.

A locking means is provided in association with the handle of the present invention so that the cleaning plate can be locked in the downward position covering the end of the tines so that unauthorized persons, such as children, cannot play with the device of the present invention and possibly get injured thereby.

Even people with arthritis and other ailments can use the present invention since squeezing, pushing and pulling, and the like are not required to clean the tines. Only a slight bump or nudge on the ejector knob is required.

The various parts of the present invention are all connected through the use of threaded members to make the same extremely simple to assemble without requiring mechanical equipment or even hand tools. This allows the present invention to be shipped disassembled thus greatly reducing shipping charges.

The design of the present invention lends itself to be produced from recycled plastic or wood or both and the spikes or tines can be properly sized steel nails.

In view of the above it is an object of the present invention to provide a simple, inexpensive and yet highly efficient means for picking up unwanted debris and dislodging the same from the pickup tines.

Another object of the present invention is to provide an improved pickup device and tine cleaner that can be readily assembled and disassembled without the use of power or hand tools.

Another object of the present invention is to provide a means for discharging picked up debris with a light push that can be accomplished with minimum effort.

Another object of the present invention is to provide, in a pickup device with an integrated tine cleaner, means for locking the same in the discharge position wherein the tines are protectively covered.

Another object of the present invention is to provide an improved pickup device and tine cleaner which can be made from virgin or recycled plastic or wood, or a combination thereof.

Other objects and advantages of the present invention will become apparent and obvious from a study of the following description and the accompanying drawings which are merely illustrative of such invention.

Figure 1:
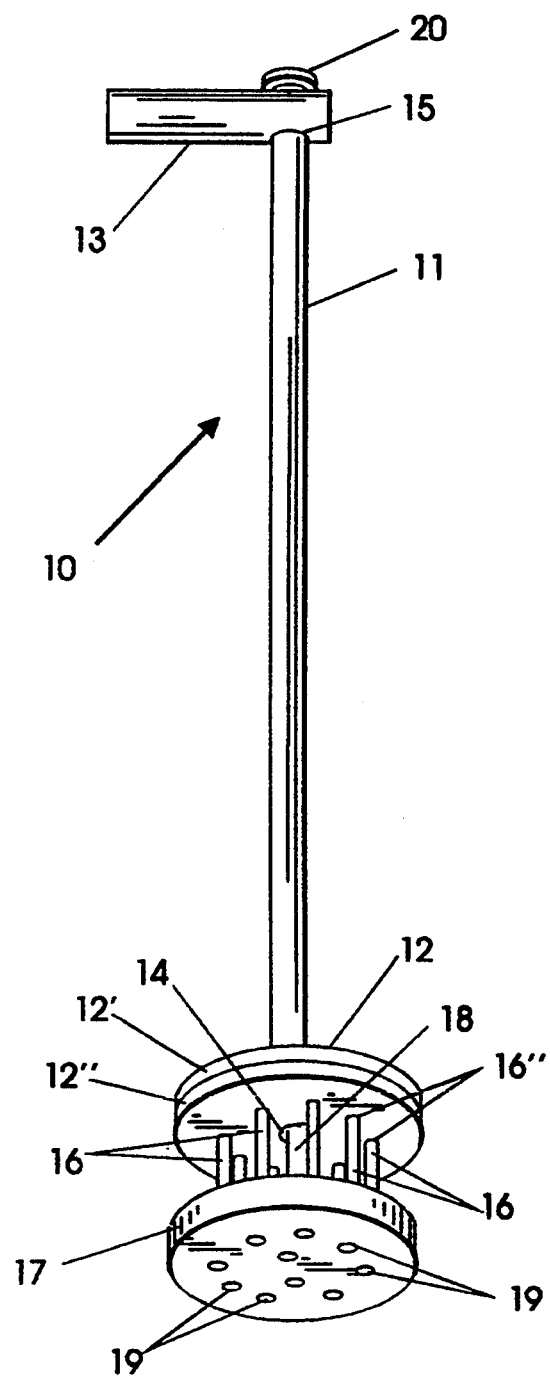
FIG. 1 is a perspective view of the improved combination pickup device and tine cleaner of the present invention with the tines retracted.

With further reference to the drawings, the improved combination pickup device and tine cleaner of the present invention, indicated generally at 10, includes a hollow, elongated sleeve 11 that mounts a tine head 12 on one end and a handle 13 on the other end.

The tine head 12 is formed from a solid upper plate 12' and a lower plate 12" with a plurality of tine openings 16' therein.

Exterior threads can be provided on sleeve 11 so that the same can be mounted in a threaded opening or recess in either the tine head 12, the handle 13 or both. Also these two members can be mounted on the sleeve by pressing the sleeve to an unthreaded recess and gluing otherwise securing the parts together. Neither of these methods require hand tools.

An opening 14 is provided in tine head 12 in axial alignment with the hollow interior of sleeve 11. Opening 15 is provided in handle 13 which is also in axial alignment with the hollow interior of sleeve 11.

A plurality of tines 16 extend downwardly or outwardly from tine head 12. These tines can simply be nails of an appropriate size passed through the tine openings 16" of the lower portion 12" of tine head 12 and held in place by the upper portion 12' thereof. The tines can also be made from hard plastic or similar material. The effect, of course, is the same.

A cleaning plate 17 is mounted on one end of an elongated actuator rod or shaft 18. The mounting of the plate on the shaft can be similar to the mounting of the tine head 12 on sleeve 11.

A plurality of openings 19 are provided in axial alignment with tines 16 so that the plate can easily slide up and down said tines.

Shaft 18 is adapted to be disposed within elongated hollow sleeve 11. An actuating knob 20 is mounted on the end of shaft 18 opposite cleaning plate 17. When knob 20 is juxtaposed to handle 13 as shown in FIG. 1, the tips 16' of tines 16 are disposed within the openings and are thus covered by cleaning plate 19, again as shown in FIG. 1.

Figure 2:
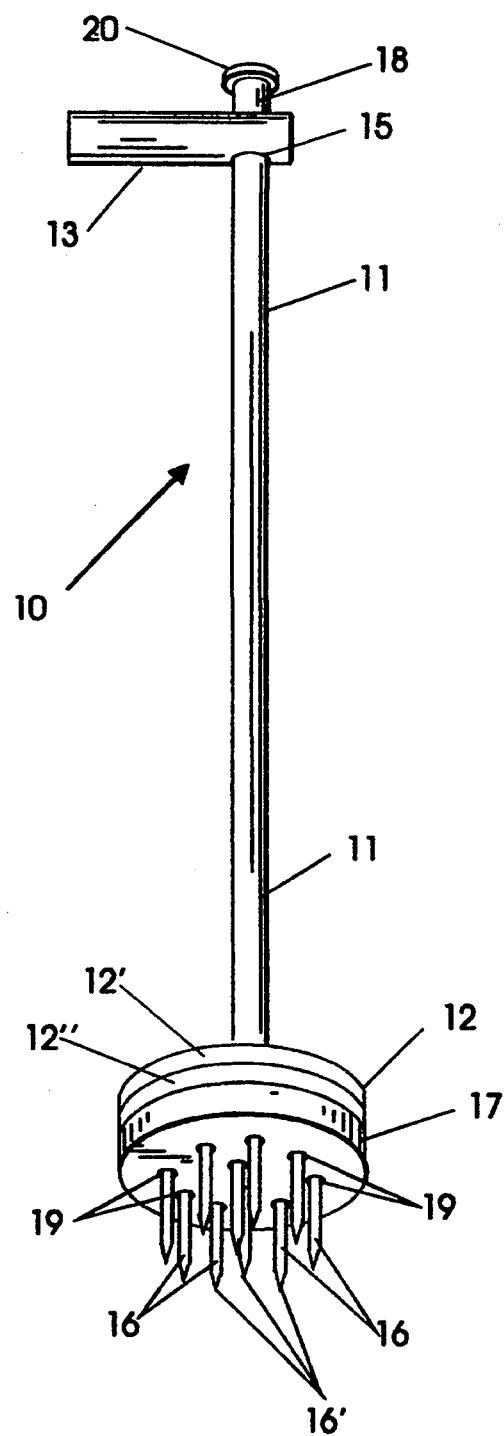
FIG. 2 is a perspective view of the device of the present invention with the tines extended.

When the cleaning plate 19 is disposed adjacent tine head 12 as seen in FIG. 2, the tines 16 are exposed and can be used for picking up trash and debris by sticking the tine tip 16' thereinto. When in this position the actuating shaft 18 extends out from the opposite end of sleeve 11 with the knob 20 being in space relation to handle 13 as can clearly be seen in FIG. 2.

From the above it can be seen that the limits of travel of shaft 18 and its associated parts within sleeve 11 are limited to approximately the length of the tines 16 as can readily be seen by comparing FIGS. 1 and 2.

Figure 3:
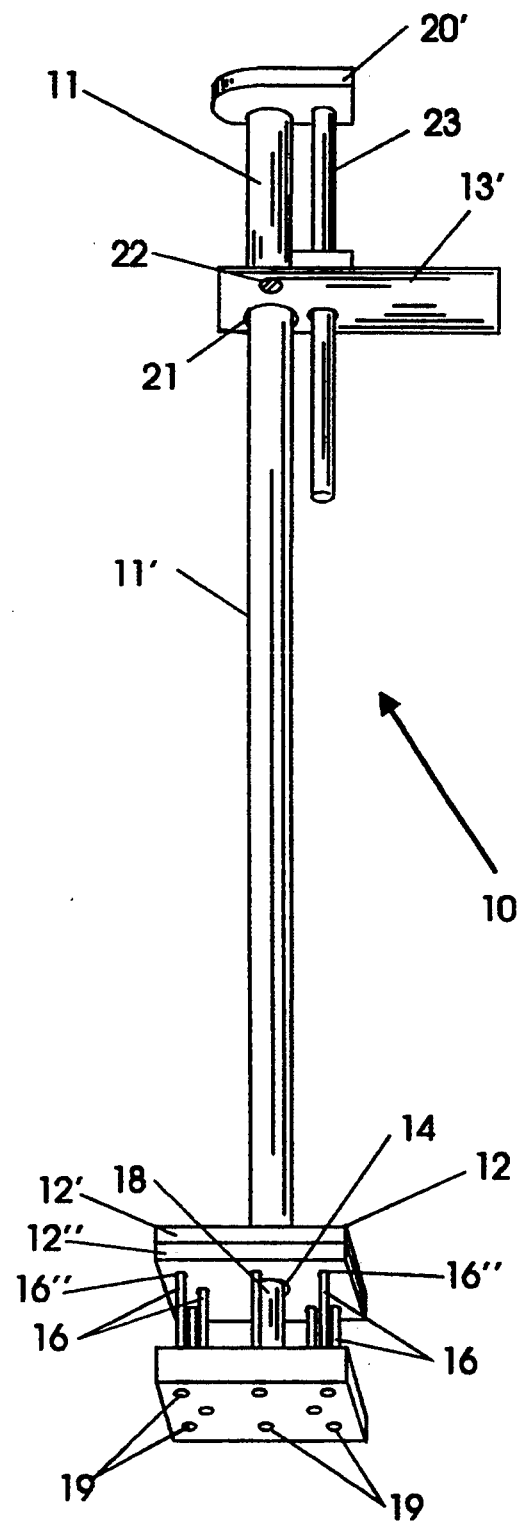
FIG. 3 is a perspective view of a modification of the present invention with the tines retracted.
Figure 4:
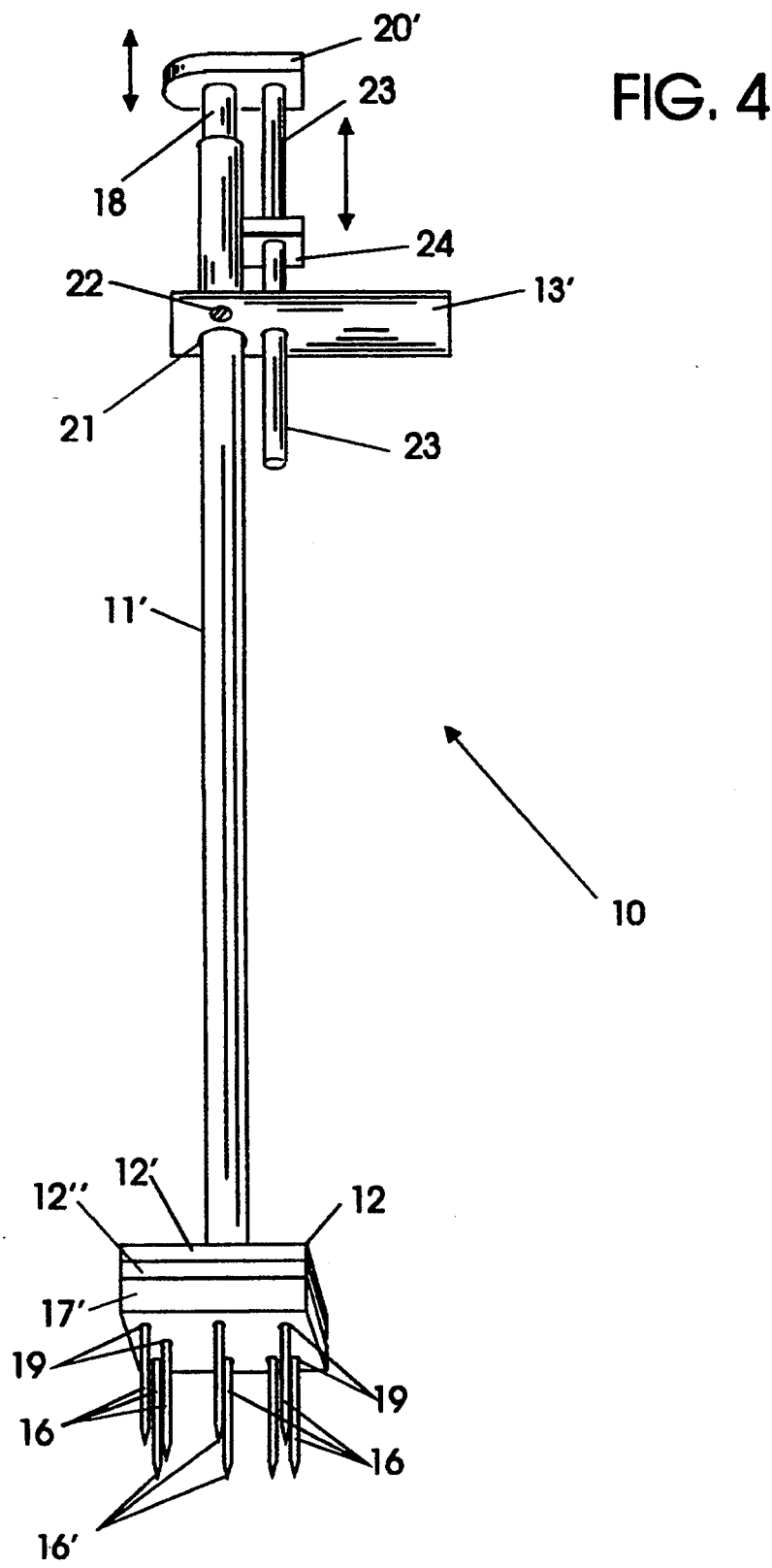
FIG. 4 is a perspective view of the modification with the tines extended.
Figure 5:
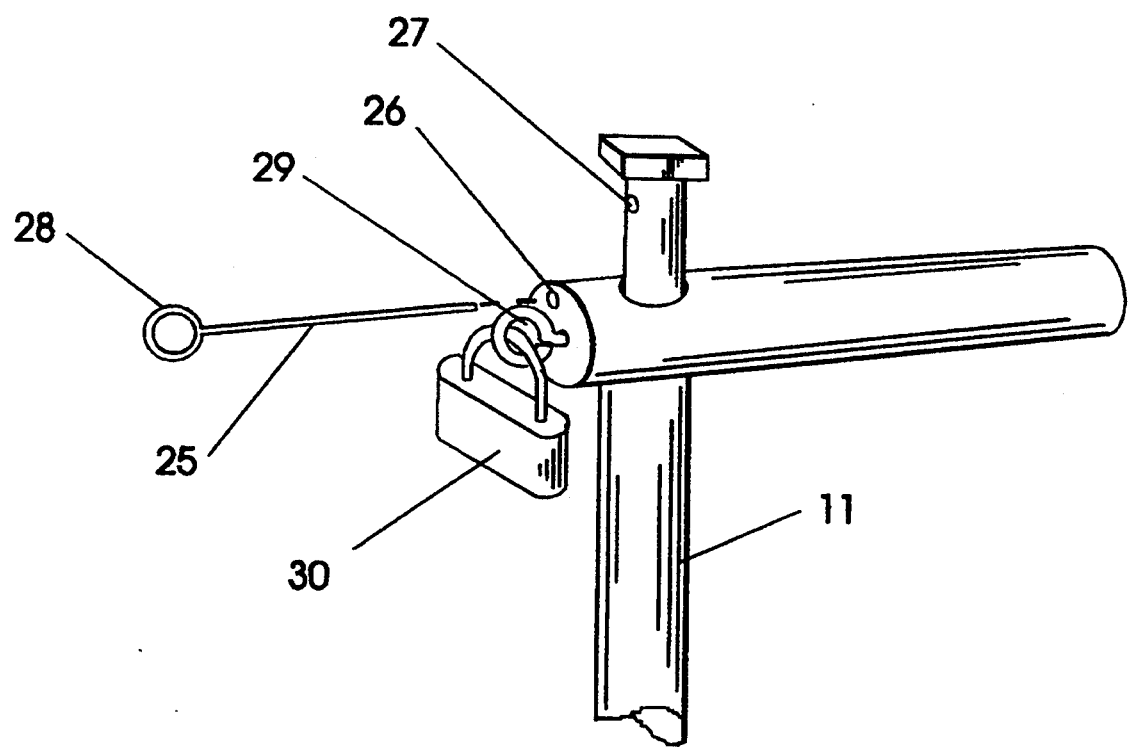
FIG. 5 is an enlarged view of the handle portion of the present invention showing the safety locking means.

To make the device of the present invention comfortable during use for different people, an adjustable handle is provided in the modification shown in FIGS. 3 and 4. In this case arm opening 21 is provided through the modified handle 13' so that it can slide up and down on the exterior of sleeve 11. A means such as a set screw can be used to hold the handle 13' at its desired location on sleeve 11.

The knob 20' on the upper ends of actuating shaft 18 opposite the cleaning plate 17 has an actuating rod 23 fixedly secured thereto that lies parallel to shalt 18 as can clearly be seen in FIGS. 3 and 4. A secondary actuating handle 13' is provided on actuating rod 23 and is adjustable along such rod in the same manner as handle 13 mounted on sleeve 11.

In all models of the present invention, a locking pin 25 can be provided and is adapted to pass through opening 26 in the respective handles and engage opening 27 in the adjacent actuating shaft 18 or 18'. The locking pin 25 includes an eyelet 28 on the end thereof which can be aligned with a screw eye 29 or similar means mounted on the handle adjacent opening 26.

When the shaft 18 and its associated parts are moved downwardly to their limit of travel so that the cleaning plate 17 is covering the tips 16' of tines 16 as shown in FIGS. 1 and 3, the locking pin 25 can be passed through the opening 26 in the handle and engage opening 27 in the actuating shaft 18. A small pad lock or other locking device 30 can then be passed through the eye of screw eye 29 and the eyelet 28 of locking pin 25 so that the locking pin cannot be pulled out of the locking engagement with opening 27 in shaft 18.

When it is again desired to use the device of the present invention, the lock 30 is simply unlocked and removed and pin 25 pulled out of the handle so that the actuating shaft 18 can again move up and down within sleeve 11.

To use the improved combination pickup device and tine cleaner of the present invention, the lock 30 and locking pin 25 are removed from the devices as described above. If the modification shown in FIGS. 3 and 4 is being used, the height of the handle 13' above the tines 16 can be adjusted to fit the user. Also the actuating knob 20' would be adjusted on parallel rod 23 as earlier described.

The device 10 of the present invention will be in the position shown in FIGS. 1 and 3. It can simply be moved over the trash, yard debris or the like and the handle pressed downwardly toward the ground the so the tines will project through the cleaning plate 17 to stick into and engage the material being picked up. As more material is picked up and the tines begin to get full, the cleaning plate will move up juxtaposed to the tine head 12. At that point the tines can be placed over the mouth of a bag, in a receptacle, or other means (not shown). At that point the activating knob can be simply manipulated by one finger on the hand of the user holding the handle to press activating knob downwardly to cause the cleaning plate 17 to move from the position shown in FIGS. 2 and 4 to the position shown in FIGS. 1 and 3 to discharge the debris from the tines.

If the debris is tightly packed on the tines so that it is difficult to manipulate the actuating knob as described above, the outwardly projecting knob can simply be tapped with the palm of the hand to cause the cleaning plate 17 to move from the pickup position shown in FIGS. 2 and 4 to the clean tine position shown in FIGS. 1 and 3.

When the cleaning up of trash, debris, etc. has been completed, the device of the present invention is left in the position shown in FIGS. 1 and 3 with the tips 16' of the tines 16 covered by the tine cleaning plate 19. At this point the locking pin 25 is reinserted into the handle and in engagement with the actuating shaft 18 and locked in place as described above.

The terms "upper" "over", etc. have been used herein merely for convenience to describe the present invention and its parts as oriented in the drawings. It is to be understood, however, that these terms are in no way limiting to the invention since such invention may obviously be disposed in different orientations when in use.

From the foregoing, it can be seen that the present invention is simple and yet extremely efficient in picking up trash, debris, etc. while standing or walking without bending over. The present invention also provides a highly efficient means for cleaning the tines associated therewith. It also is safe to store with the tine tips covered to prevent accidental injury. Finally, the present invention can be shipped in a relatively small package and can then be readily assembled by the purchaser without requiring power tools or hand tools.

What is claimed is:

1. A combination pickup device and tine cleaner comprising: an elongated sleeve having an axial opening therethrough; a tine head mounted on one end of said sleeve and an outwardly projecting handle mounted adjacent the opposite end; a plurality of tines mounted on said head and outwardly projecting therefrom parallel to and away from said sleeve; an axially movable actuating shaft mounted in said sleeve and projecting from opposite ends thereof; a tine cleaning plate mounted on the end of said shaft adjacent said tine head; said plate having a plurality of openings extending therethrough in axial alignment with the tines of said tine head; an actuating knob mounted on the end of said actuating shaft opposite said cleaning plate and an eyelet locking pin that passes laterally through said sleeve and at least partially through said shaft for locking the plate over the outer tips of said tine whereby the device of the present invention can be used to impale trash and debris on the tines for pickup and the same can be removed therefrom by simply moving the actuating knob toward the tine head.

2. The device of claim 1 wherein the eyelet locking pin includes a padlock for holding the locking pin in place.

3. The device of claim 1 wherein said outwardly projecting handle is adjustably mounted adjacent the end of the sleeve opposite the end mounting the tine head.

* * * * *